United States Patent
Lee et al.

(10) Patent No.: US 10,218,198 B2
(45) Date of Patent: Feb. 26, 2019

(54) BATTERY PACK

(71) Applicant: SAMSUNG SDI CO., LTD., Yongin-si, Gyeonggi-do (KR)

(72) Inventors: Myungsang Lee, Yongin-si (KR); Kyongpil Jin, Yongin-si (KR)

(73) Assignee: SAMSUNG SDI CO., LTD., Yongin-Si, Gyeonggi-Do (KR)

(*) Notice: Subject to any disclaimer, the term of this patent is extended or adjusted under 35 U.S.C. 154(b) by 79 days.

(21) Appl. No.: 15/354,130

(22) Filed: Nov. 17, 2016

(65) Prior Publication Data

US 2018/0019607 A1     Jan. 18, 2018

(30) Foreign Application Priority Data

Jul. 13, 2016   (KR) .................. 10-2016-0088766

(51) Int. Cl.
    *H02J 7/00*        (2006.01)
    *A47L 9/28*        (2006.01)
    *H02P 7/28*        (2016.01)

(52) U.S. Cl.
CPC .......... *H02J 7/0063* (2013.01); *A47L 9/2842* (2013.01); *A47L 9/2868* (2013.01); *A47L 9/2884* (2013.01); *H02J 7/0068* (2013.01); *H02P 7/28* (2013.01)

(58) Field of Classification Search
CPC .... Y02E 60/12; G01R 31/3648; H01M 10/44; H02J 7/0031; H02J 7/0047
USPC ......................................................... 320/127
See application file for complete search history.

(56) References Cited

U.S. PATENT DOCUMENTS 3,781,658 A * 12/1973 Godshalk ........... G01R 31/3627
                                                       324/431
6,184,660 B1 * 2/2001 Hatular .................. H02J 7/022
                                                       320/139

FOREIGN PATENT DOCUMENTS

| KR | 1992-0020818 A | 11/1992 |
|---|---|---|
| KR | 10-2001-0039005 A | 5/2001 |
| KR | 2002-0068939 A | 8/2002 |
| KR | 10-2008-0002078 A | 1/2008 |

* cited by examiner

*Primary Examiner* — Arun C Williams
(74) *Attorney, Agent, or Firm* — Lee & Morse, P.C.

(57) ABSTRACT

A battery pack includes a battery and a battery manager. The battery includes a plurality of battery cells. The battery manager includes a mode receiver that receives signals from an electronic device through an input terminal. The signals are indicative of respective modes of operation of the electronic device.

8 Claims, 6 Drawing Sheets

BATTERY PACK

CROSS-REFERENCE TO RELATED APPLICATION

Korean Patent Application No. 10-2016-0088766, filed on Jul. 13, 2016, and entitled, "Battery Pack," is incorporated by reference herein in its entirety.

BACKGROUND

1. Field

One or more embodiments described herein relate to a battery pack.

2. Description of the Related Art

Various types of secondary batteries have been developed. Low-capacity secondary batteries are used in cellular phones and other small portable electronic devices have one battery cell in a pack. High-power secondary batteries are used to power wireless cleaners, electric bicycles, electric vehicles, and the like, and thus have multiple battery cells connected in a pack In, for example, a wireless cleaner, the battery pack may control suction intensity of a motor based on the mode of operation of the cleaner. The suction intensity may be controlled, for example, by controlling the amount of discharge current from the battery cells in the pack based on the mode.

SUMMARY

In accordance with one or more embodiments, a battery pack includes a battery including a plurality of battery cells; and a battery manager to manage the battery, wherein the battery manager includes a mode receiver to receive signals from an electronic device through a same input terminal, the signals indicative of respective modes of operation of the electronic device. The mode receiver may include a first transistor, a second transistor and a third transistor connected in parallel to the input terminal. The battery pack may include a first Zener diode electrically connected between the second transistor and the input terminal, and a second Zener diode electrically connected between the third transistor and the input terminal.

The battery manager may include a main controller to receive information from the mode receiver and to control the battery and the external electronic device, wherein the main controller may classify the signals output from the electronic device based on on/off information of the first transistor, the second transistor, and the third transistor and to control the battery and the external electronic device.

Only the first transistor may turn on when the signal output from the external device is higher than a first reference voltage and lower than a second reference voltage, and the main controller may interrupt operation of the external electronic device when only the first transistor is turned on.

The first and second transistors may turn on when the signal output from the external device is higher than a second reference voltage and lower than a third reference voltage, and the main controller may discharge the battery to supply a first discharge current to the external device.

The first, second, and third transistors may turn on when the signal output from the external device is higher than a third reference voltage, and the main controller may discharge the battery to supply a second discharge current to the external device.

The external device may include a mode selector to select one of the modes of operation and a motor to receive discharge current from the battery. The mode selector may include a first switch and a first resistor to operation for a first mode, a second switch and a second resistor for a second mode, and third switch and a third resistor for a third mode, the first, second, and third resistors have different resistance values. The mode receiver may receive an output voltage of the mode selector.

In accordance with one or more other embodiments, a battery manager may include a receiver to receive a signal from an external device and a controller to control operation of the external device based on the signal received by the receiver, wherein the signal is indicative of one of a plurality of modes of operation of the external device and wherein the controller is to control operation of the external device to based on the signal. The mode receiver may include a first transistor, a second transistor, and a third transistor connected to the controller, and the first, second, and third transistors may be turned on or off to generate different signals for the controller based on a value of the signal from the external device.

The controller may generate a signal to interrupt operation of the external device when the signal from the external device has a first value and only the first transistor is turned on. The controller may generate a signal to cause the external device to operate at a first frequency when the signal from the external device has a second value and the first and second transistors are turned on. The controller may generate a signal to cause the external device to operate at a second frequency when the signal from the external device has a third value and the first, second, and third transistors are turned on. The first, second, and third transistors may be turned on or off based on the value of the signal from the external device.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments (or portions thereof) may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
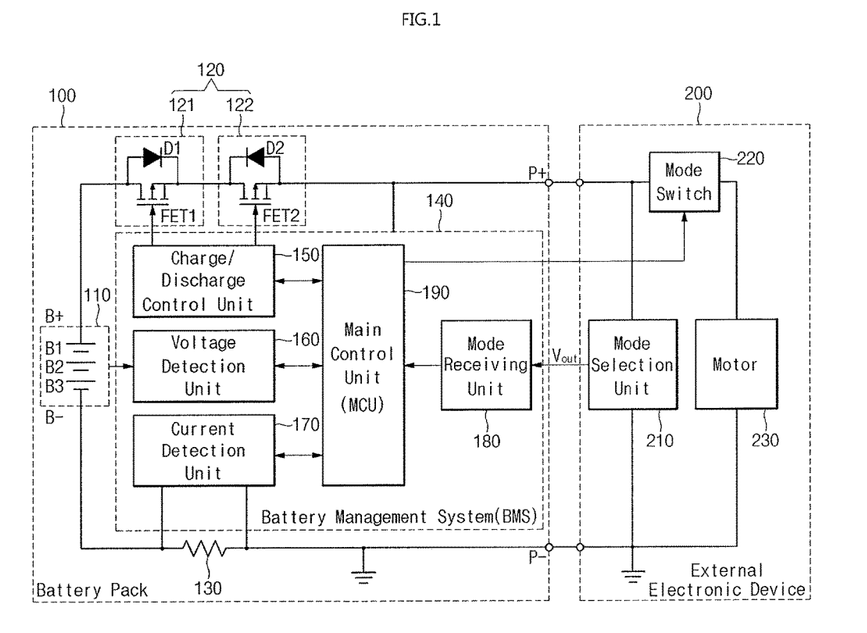
FIG. 1 illustrates a state in which a battery pack is connected to an external electronic device in accordance with one embodiment.
Figure 2:
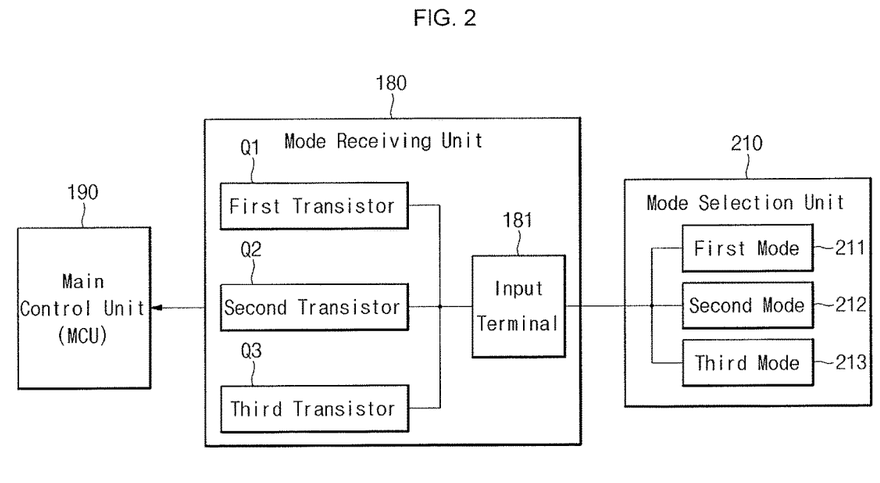
FIG. 2 illustrates an embodiment of a mode receiving unit of a battery pack and a mode selection unit of an external electronic device.
Figure 3:
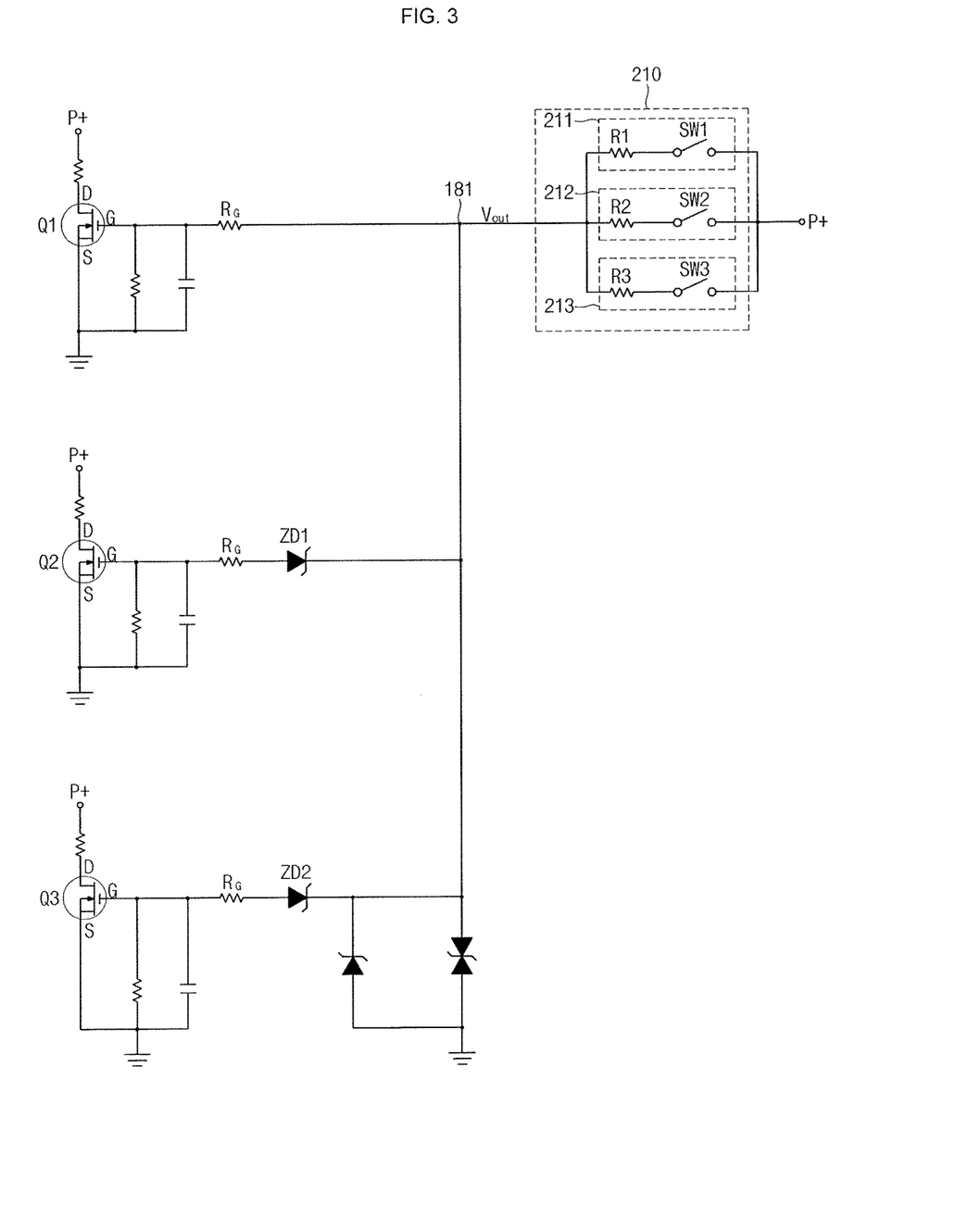
FIG. 3 illustrates a circuit embodiment of the mode receiving unit and the mode selection unit.

FIG. 1 illustrating a state in which a battery pack 100 is connected to an external electronic device 200 in accordance with one embodiment. FIG. 2 illustrates an embodiment of a mode receiving unit of the battery pack 100 and a mode selection unit of the external electronic device 200 in FIG. 1. FIG. 3 illustrates a circuit embodiment of the mode receiving unit and the mode selection unit.

Referring to FIGS. 1 to 3, the battery pack 100 includes a battery 110, a charge/discharge device 120, a sensor resistor 130 and a battery management system (BMS) 140. The battery pack 100 is connected to the external electronic device 200 through pack terminals P+ and P−. The external electronic device 200 may be, for example, a wireless cleaner, an electronically driven tool, a cellular phone, a smart phone or a notebook computer. In another embodiment, the external electronic device 200 may be a charger. For illustrative purposes only, the external electronic device 200 will be discussed as a wireless cleaner.

The external electronic device 200 may include a mode selection unit 210, a motor switch 220, and a motor 230. The mode selection unit 210 selects the mode of a wireless cleaner, for example, as desired by a user or based on a programmed control signal. The mode selection unit 210 may include a first mode 211, a second mode 212, and a third mode 213. The mode selection unit 210 may have more or fewer modes than the first to third modes 211 to 213 in other embodiments.

The first mode 211 is an off mode for interrupting operation of the wireless cleaner. The second mode 212 and the third mode 213 may be modes for operating the wireless cleaner. The second mode 212 may be a normal mode in which the motor 230 operates at a first rotational speed. The third mode 213 may be a turbo mode in which the motor 230 operates at a second rotational speed greater than the first rotational speed. The first to third modes 211, 212, and 213 may be different, for example, according to use.

Resistors R1, R2, and R3 have different values and are connected to according to the modes of the mode selection unit 210, in order to output different voltages Vout for the respective modes, for example, according to user mode selection. A first switch SW1 and a first resistor R1 are electrically connected to the first mode 211. A second switch SW2 and a second resistor R2 are electrically connected to the second mode 212. A third switch SW3 and a third resistor R3 are electrically connected to the third mode 213.

A pack plus terminal P+ of the battery pack 100 is connected to the mode selection unit 210. For example, if the user selects the first mode 211, the first switch is turned on to electrically connect the pack plus terminal P+ to the first resistor R1. If the user selects the second mode 212, the second switch is turned on to electrically connect the pack plus terminal P+ to the second resistor R2. If the user selects the third mode 213, the third switch is turned on to electrically connect the pack plus terminal P+ to the third resistor R3. Therefore, the output voltage Vout of the mode selection unit 210 is determined such that the voltage of the pack plus terminal P+ passes through the resistor of the selected mode.

In one embodiment, when the first mode 211 is selected, the output voltage Vout of the mode selection unit 210 is less than the output voltage Vout when the second mode 212 is selected. When the second mode 212 is selected, the output voltage Vout of the mode selection unit 210 is less than the output voltage Vout when the third mode 213 is selected. For example, the resistance of the first resistor R1 is greater than that of the second resistor R2, and the resistance of the second resistor R2 is greater than that of the third resistor R3, e.g., R1>R2>R3.

During operation of the motor 230, the wireless cleaner performs a cleaning operation. The motor switch 220 is connected to the motor 230. When the motor switch 220 is turned on, power is supplied to the motor 230 and the motor 230 operates. When the motor switch 220 is turned off, power supplied to the motor 230 is interrupted and the motor 230 stops operating. The motor switch 220 may be controlled by the battery management system 140.

The battery 110 may include one or more battery cells B1, B2, and B3 and may be charged or discharged to a constant voltage. The battery 110 has a plus terminal B+ and a minus terminal B−. The plus terminal B+ and the minus terminal B− of the battery 110 are electrically connected to the pack plus terminal P+ and the pack minus terminal P− of the battery pack 100, respectively. The pack plus terminal P+ and the pack minus terminal P− may be electrically connected to the external electronic device 200 and may be external terminals.

In FIG. 1, the battery 110 includes three battery cells B1, B2, and B3 connected in series. The number of battery cells and/or the connection relationship of the battery cells (e.g., series or parallel) may be different in another embodiment, for example, to satisfy the capacity required by the external electronic device 200.

The charge/discharge device 120 includes a charge device 121 and a discharge device 122. The charge device 121 and the discharge device 122 are connected in series between the battery plus terminal B+ of the battery 110 and the pack plus terminal P+ and perform charging or discharging of the battery 110. Each of the charge device 121 and the discharge device 122 includes a transistor (e.g., a field effect transistor (FET)) and a parasitic diode (D).

For example, the charge device 121 includes FET1 and D1 and the discharge device 122 includes FET2 and D2. The source and a drain of the field effect transistor FET1 of the charge device 121 are connected to each other in an opposite direction to a direction in which the source and a drain of the field effect transistor FET2 of the discharge device 122 are connected to each other. With this configuration, the field effect transistor FET1 of the charge device 121 may limit the flow of current from an external power source to the battery 110.

The field effect transistor FET2 of the discharge device 122 is connected to limit the flow of current from the battery 110 to an external electronic device 200. For example, when the charge device 121 is turned on, external power source is connected to the battery 110 to charge the battery 110. When the discharge device 122 is turned on, the battery 110 is discharged to supply power to the external electronic device 200. In another embodiment, the field effect transistors FET1 and FET2 of the charge device 121 and the discharge device 122 may be replaced by other types of switching devices or types of electric devices that are able to perform switching functions.

The sensor resistor 130 is connected between the minus terminal B− of the battery 110 and the pack minus terminal P−. Opposite ends of the sensor resistor 130 are connected to a current detection unit 170 of the battery management system 140. Accordingly, the current detection unit 170 may detect charge/discharge current of the battery 110 by identifying voltage values of opposite ends of the sensor resistor 130 and a resistance value of the sensor resistor 130. The sensor resistor 130 therefore transmits information relating to the charge/discharge current of the battery 110 to the current detection unit 170.

The battery management system 140 includes a charge/discharge control unit 150, a voltage detection unit 160, a current detection unit 170, a mode receiving unit 180, and a main control unit (MCU) 190. The charge/discharge control unit 150 is connected to the charge device 121 and the discharge device 122 and controls the main control unit 190 to operate the charge device 121 and the discharge device 122.

For example, when external power is connected to the pack plus terminal P+ and the pack minus terminal P−, the charge/discharge control unit 150 may turn on the charge device 121 based on a command of the main control unit 190. The battery 110 may then be charged. When the external electronic device 200 is connected to the pack plus terminal P+ and the pack minus terminal P−, the charge/discharge control unit 150 may turn on the discharge device 122 based on a command of the main control unit 190. The battery 110 may then be discharged to supply power to the external electronic device 200.

The voltage detection unit 160 is connected to the battery cells B1, B2, and B3, respectively to detect voltages of the battery 110. The detected voltages are transmitted to the main control unit 190. The current detection unit 170 is connected to the sensor resistor 140 to detect charge/discharge current of the battery 110. The detected charge/discharge current are then transmitted to the main control unit 190.

The mode receiving unit 180 includes an input terminal 181 and a first transistor Q1, a second transistor Q2, and a third transistor Q3 connected in parallel to the input terminal 181. The voltage Vout output from the mode selection unit 210 of the external electronic device 200 is input to the input terminal 181. The first, second, and third transistors Q1, Q2, and Q3 may be turned on by the output voltage Vout. For example, the output voltage Vout of the mode selection unit 210 may be determined based on voltages divided by one of the resistors R1, R2, or R3 connected to the respective modes and a gate resistor RG. For example, the mode receiving unit 180 applies the output voltage Vout of the mode selection unit 210 and transmits on/off information of the first, second, and third transistors Q1, Q2, and Q3 to the main control unit 190 based on the output voltage Vout.

The first transistor Q1, the second transistor Q2 and the third transistor Q3 may be connected, in parallel, to the input terminal 181 and may be turned on based on the output voltage Vout input to the input terminal 181. The first transistor Q1 may be a field effect transistor FET, but may be different type of switch in another embodiment. The input terminal 181 is electrically connected to the gate terminal G of the first transistor Q1 through the gate resistor $R_G$. The pack plus terminal P+ is electrically connected to the drain terminal D through the resistor. Ground GND is electrically connected to the source terminal S. A resistor and capacitor may be connected, in parallel, between the gate terminal G and the source terminal S.

The second and third transistors Q2 and Q3 type of element as the first transistor Q1. However, a first Zener diode ZD1 may also be connected to the gate terminal G of the second transistor Q2 and a second Zener diode ZD2 may also be connected to the gate terminal G of the third transistor Q3. A Zener voltage of the first Zener diode ZD1 may be less than that of the second Zener diode ZD2.

In addition, a voltage of the input terminal 181 for turning on the first transistor Q1 may be a first reference voltage V1, a voltage of the input terminal 181 for turning on the second transistor Q2 may be a second reference voltage V2, and a voltage of the input terminal 181 for turning on the third transistor Q3 may be a third reference voltage V3. Since the first and second Zener diodes ZD1 and ZD2 are connected to the gate terminals G of the second and third transistors Q2 and Q3, respectively, the second and third reference voltages V2 and V3 should be greater than the first reference voltage V1.

Since the Zener voltage of the first Zener diode ZD1 is less than that of the second Zener diode ZD2, the second reference voltage V2 may be lower than the third reference voltage V3. Thus, in one embodiment, the second reference voltage V2 may be greater than the first reference voltage V1, and the third reference voltage V3 may be greater than the second reference voltage V2, e.g., V1<V2<V3.

When the output voltage Vout of the mode selection unit 210, that is input to the input terminal 181, is greater than the first reference voltage V1 and lower than the second reference voltage V2 (e.g., V1<Vout<V2), the first transistor Q1 is turned on and the second and third transistors Q2 and Q3 are in turn-off states.

When the output voltage Vout of the mode selection unit 210, that is input to the input terminal 181, is greater than the second reference voltage V2 and lower than the third reference voltage V3 (e.g., V2<Vout<V3), the first and second transistors Q1 and Q2 are turned on and the third transistor Q3 is in a turn-off state.

When the output voltage Vout of the mode selection unit 210, that is input to the input terminal 181, is greater than the third reference voltage V3 (e.g., Vout>V3), the first, second, and third transistors Q1, Q2, and Q3 are all turned on.

As described above, the mode receiving unit 180 receives various mode selection signals (e.g., different output voltages) through the input terminal 181 according to respective modes of the wireless cleaner. This simplifies the circuitry, improves circuit design efficiency, and saves manufacturing costs.

According to one proposed arrangement, the number of input terminals of the battery corresponds to the number of modes of the external device, e.g., three input terminals of the battery pack are used to support three modes of the wireless cleaner. In this case, a mode selection signal is input through a first input terminal when a first mode is selected, is input through a second input terminal when a second mode is selected, and is input through a third input terminal when a third mode is selected. The size of the battery pack therefore increases with the number of operational modes of the external device, e.g., increasing the number of modes of the external device produces a corresponding increase in the number of input terminals of the battery pack. This increases the manufacturing costs of the battery pack.

According to one or more embodiments described herein, even when the number of modes of the external device is increased, the mode selection signal Vout may be input through only one input terminal 181. Also, the selected mode may be discriminated, thereby reducing the size and manufacturing costs of the battery pack.

The main control unit 190 receives information indicative of the voltage and current of the battery 110 from the voltage detection unit 160 and the current detection unit 170, respectively. Based on the voltage and current information, the main control unit 190 issues a command to the charge/discharge control unit 150 to control operations of the charge device 121 and the discharge device 122.

The main control unit 190 of the battery pack 100 generates controls for the motor 230 of the external electronic device 200 based on information from the mode receiving unit 180. For example, the main control unit 190 may generate a signal to turn on/off the motor switch 220 connected to the motor 230 based on information output from the mode receiving unit 180. Also, the main control unit 190 may control the amount of current discharged from the battery 110 to the external electronic device 200 based on information output from the mode receiving unit 180, to thereby control the driving speed of the motor 230.

For example, when information is received from the mode receiving unit 180 indicating that the first transistor Q1 is turned on and the second and third transistors Q2 and Q3 are turned-off (e.g., when a user selects a first mode), the main control unit 190 may generate a control signal to turn off the motor switch 220 in order to interrupt operation of the motor 230.

When information is received from the mode receiving unit 180 indicating that the first and second transistors Q1 and Q2 are turned on and the third transistor Q3 is turned-off (e.g., when the user selects a second mode), the main control unit 190 may generate a control signal to turn on the motor switch 220. In addition, the main control unit 190 may generate a control signal to control the charge/discharge control unit 150 to supply first discharge current to the motor 230.

When information is received from the mode receiving unit 180 indicating that the first, second, and third transistors Q1, Q2, and Q3 are all turned on (e.g., when the user selects a third mode), the main control unit 190 may generate a control signal to turn on motor switch 220. In addition, the main control unit 190 may generate a control signal to control the charge/discharge control unit 150 to supply a second discharge current greater than the first discharge current to the motor 230.

Figure 4:
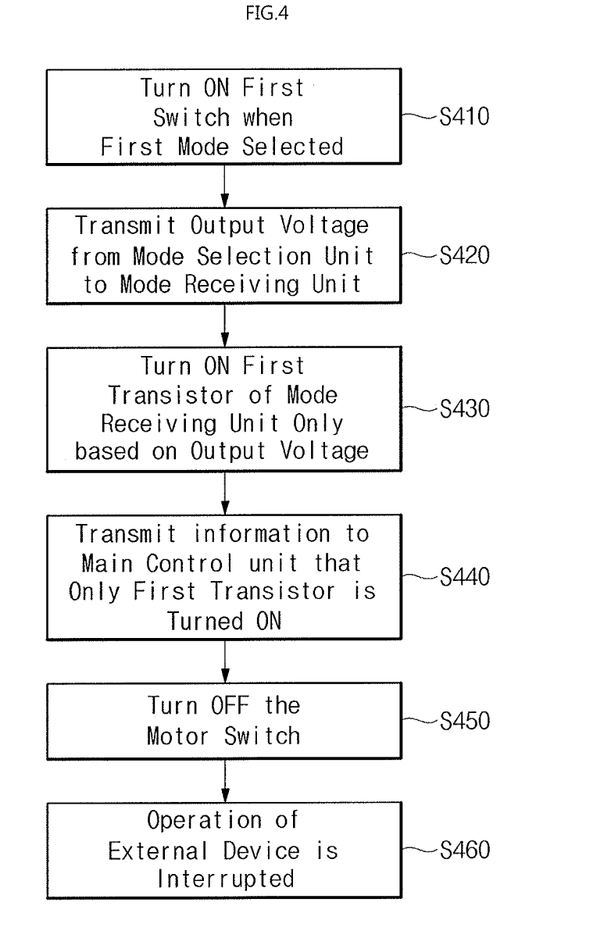
FIGS. 4, 5, and 6 illustrate an embodiment of a method for operating an external electronic device connected to a battery pack.
Figure 5:
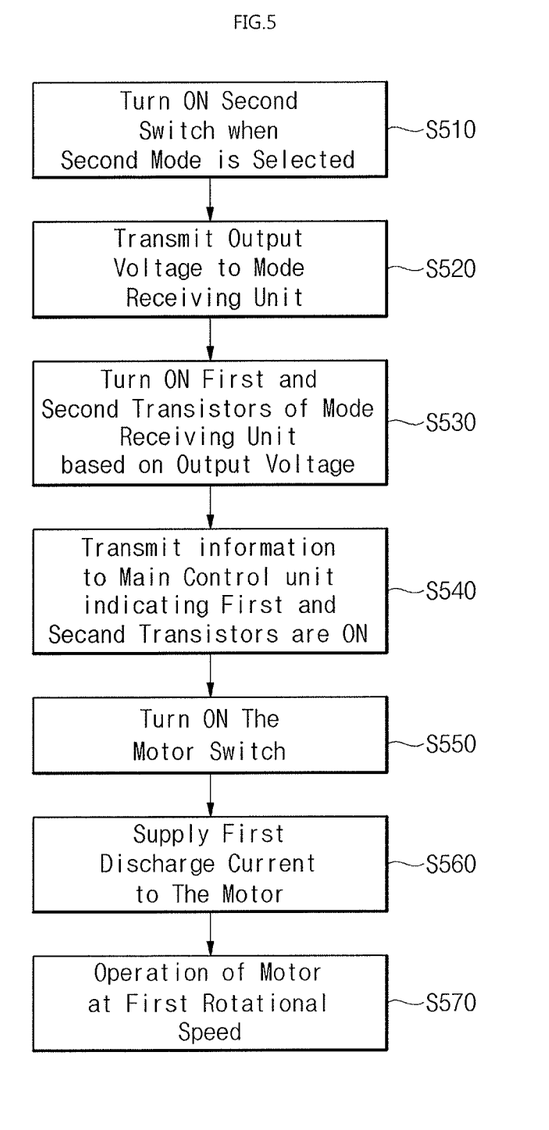
Figure 6:
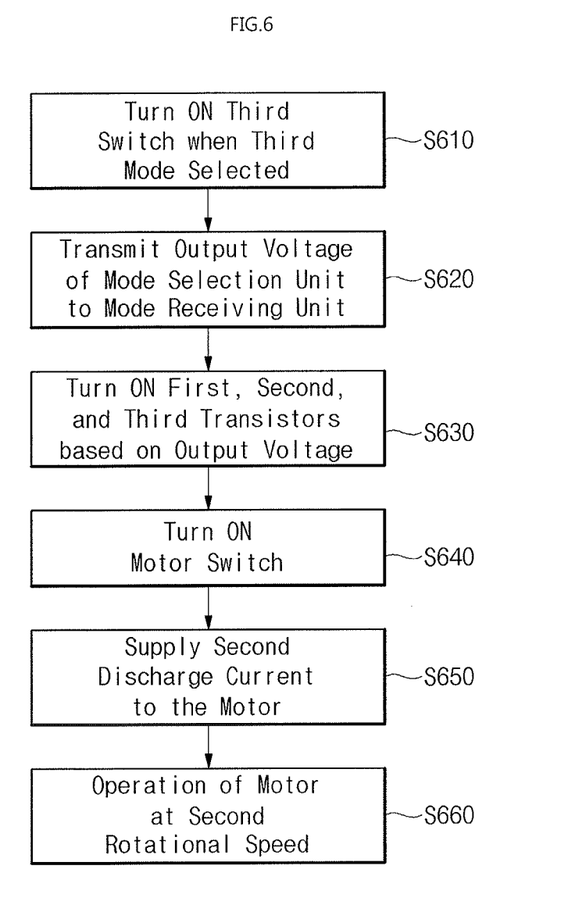

FIGS. 4, 5, and 6 illustrate an embodiment of a method for operating an external electronic device connected to a battery pack. The external electronic device and battery pack may, for example, be the ones described in FIGS. 1 to 3.

Referring to FIG. 4, the first switch SW1 is turned on when a user selects a first mode 211 (e.g., OFF mode) from the mode selection unit 210 (S410). As a result, the plus terminal P+ of the battery pack is electrically connected the first resistor R1, and the output voltage Vout of the mode selection unit 210 is transmitted to the input terminal 181 of the mode receiving unit 180 (S420).

The voltage Vout output through the first resistor R1 may be greater than the first reference voltage V1 and lower than the second reference voltage V2 (e.g., V1<Vout<V2). Therefore, only the first transistor Q1 of the mode receiving unit 180 is turned on by the output voltage Vout (S430). Also, information indicating that only the first transistor Q1 is turned on is transmitted to the main control unit 190 (S440).

The main control unit 190 determines that the first mode 211 is selected based on this information and turns off the motor switch 220 (S450). Because the motor switch 220 is turned off, the motor 230 does not operate. Thus, operation of the external electronic device 200 is interrupted (S460).

Referring to FIG. 5, the second switch SW2 is turned on when the user selects a second mode 212 (e.g., normal mode) from the mode selection unit 210 (S510). The plus terminal P+ of the battery pack is electrically connected to the second resistor R2, and the output voltage Vout of the mode selection unit 210 is transmitted to the input terminal 181 of the mode receiving unit 180 (S520).

The voltage Vout output through the second resistor R2 may be greater than a second reference voltage V2 and less than a third reference voltage V3 (e.g., V2<Vout<V3). Therefore, the first transistor Q1 and the second transistor Q2 of the mode receiving unit 180 are turned on by the output voltage Vout (S530). Information indicating that the first transistor Q1 and the second transistor Q2 are turned on is then transmitted to the main control unit 190 (S540).

The main control unit 190 determines that the second mode 212 is selected based on this information and then turns on the motor switch 220 (S550).

The main control unit 190 then controls the charge/discharge control unit 150 to supply first discharge current to the motor 230 (S560). Because the motor switch 220 is turned on and the first discharge current is supplied to the motor 230, the motor 230 operates at a first rotational speed (S570).

Referring to FIG. 6, the third switch SW3 is turned on when the user selects a third mode 213 (e.g., turbo mode) from the mode selection unit 210 (S610). The plus terminal P+ of the battery pack is then electrically connected to the third resistor R3 and the output voltage Vout of the mode selection unit 210 is transmitted to the input terminal 181 of the mode receiving unit 180 (S620). The voltage Vout output through the third resistor R3 may be greater than a third reference voltage V3 (e.g., Vout>V3). Therefore, the first transistor Q1, the second transistor Q2, and the third transistor Q3 of the mode receiving unit 180 are all turned on based on the output voltage Vout (S630).

Information is transmitted to the main control unit 190 indicating that the first transistor Q1, the second transistor Q2, and the third transistor Q3 are all turned on. Based on this information, the main control unit 190 determines that the third mode 213 is selected and then turns on the motor switch 220 (S640).

In addition, the main control unit 190 controls the charge/discharge control unit 150 to supply second discharge current to the motor 230 (S650). Because the motor switch 220 is turned on and the second discharge current is supplied to the motor 230, the motor 230 operates at a second rotational speed (S660).

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The battery management system or manager and the other processing features of the embodiments disclosed herein may be implemented in logic which, for example, may include hardware, software, or both. When implemented at least partially in hardware, the battery management system or manager and the other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the battery management system or manager and the other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Example embodiments have been disclosed herein, and although specific terms are employed, they are used and are to be interpreted in a generic and descriptive sense only and not for purpose of limitation. The embodiments (or portions thereof) may be combined to form additional embodiments. In some instances, as would be apparent to one of skill in the art as of the filing of the present application, features, characteristics, and/or elements described in connection with a particular embodiment may be used singly or in combination with features, characteristics, and/or elements in connection with other embodiments unless otherwise indicated. Accordingly, it will be understood by those of skill in the art that various changes in form and details may be made without departing from the spirit and scope of embodiments set forth in the claims.

What is claimed is:

1. A battery pack, comprising:
   a battery including a plurality of battery cells; and
   a battery manager to manage the battery, wherein the battery manager includes a mode receiver to receive mode selection signals from an electronic device wherein all mode selection signals are input through a same input terminal, wherein,
   the mode receiver includes a first transistor, a second transistor, and a third transistor connected in parallel to the input terminal, and
   the battery manager includes a main controller to receive information from the mode receiver and to control the battery and the electronic device, wherein the main controller is to classify the mode selection signals from the electronic device based on on/off information of the first transistor, the second transistor, and the third transistor and to control the battery and the electronic device.

2. The battery pack as claimed in claim 1, further comprising:
   a first Zener diode is electrically connected between the second transistor and the input terminal, and
   a second Zener diode is electrically connected between the third transistor and the input terminal.

3. The battery pack as claimed in claim 1, wherein:
   only the first transistor is to turn on when the mode selection signal from the electronic device is higher than a first reference voltage and lower than a second reference voltage, and
   the main controller to interrupt operation of the electronic device when only the first transistor is turned on.

4. The battery pack as claimed in claim 1, wherein:
   the first and second transistors are to turn on when the mode selection signal from the electronic device is higher than a second reference voltage and lower than a third reference voltage, and
   the main controller is to discharge the battery to supply a first discharge current to the electronic device.

5. The battery pack as claimed in claim 1, wherein:
   the first, second, and third transistors are to turn on when the mode selection signal from the electronic device is higher than a third reference voltage, and
   the main controller is to discharge the battery to supply a second discharge current to the electronic device.

6. The battery pack as claimed in claim 1, wherein the electronic device includes a mode selector to allow for selection of one of the modes of operation and a motor to receive discharge current from the battery.

7. The battery pack as claimed in claim 6, wherein:
   the mode selector includes:
      a first switch and a first resistor to operation for a first mode,
      a second switch and a second resistor for a second mode, and
      a third switch and a third resistor for a third mode,
   the first, second, and third resistors have different resistance values.

8. The battery pack as claimed in claim 6, wherein the mode receiver is to receive an output voltage of the mode selector.

* * * * *